United States Patent [19]

Trumbull

[11] 4,105,246
[45] Aug. 8, 1978

[54] MULTI-PURPOSE DASHBOARD ATTACHMENT

[76] Inventor: Gerald M. Trumbull, 522 Irish Settlement Rd., Freeville, N.Y. 13068

[21] Appl. No.: 808,105

[22] Filed: Jun. 20, 1977

[51] Int. Cl.² ............................................. B60J 3/00
[52] U.S. Cl. ................................... 296/97 E; 98/2.09
[58] Field of Search ................ 296/97 R, 97 A, 97 E; 98/2.09

[56] References Cited

U.S. PATENT DOCUMENTS

| 2,410,171 | 10/1946 | Lande | 296/97 E |
| 2,659,942 | 11/1953 | Iverson | 98/2.09 |
| 3,159,421 | 12/1964 | Samuelson | 296/97 A |

*Primary Examiner*—Philip Goodman
*Attorney, Agent, or Firm*—Charles S. McGuire

[57] ABSTRACT

An attachment for the dashboard of a motor vehicle including a rectangular panel pivotally movable between positions approximately parallel to the top of the dashboard and to the windshield and having a raised lip bordering three sides which contacts the windshield when the panel is raised. The defroster outlet discharges into the space between the panel and windshield, the air being confined by the lip and exiting through one or more air outlet passages therein. The panel serves as an effective glare and heat shield when in its raised position. A shallow drawer, which may be extended to provide a shelf disposed within a recess in the dashboard and is covered by the panel when in its lower position.

9 Claims, 5 Drawing Figures

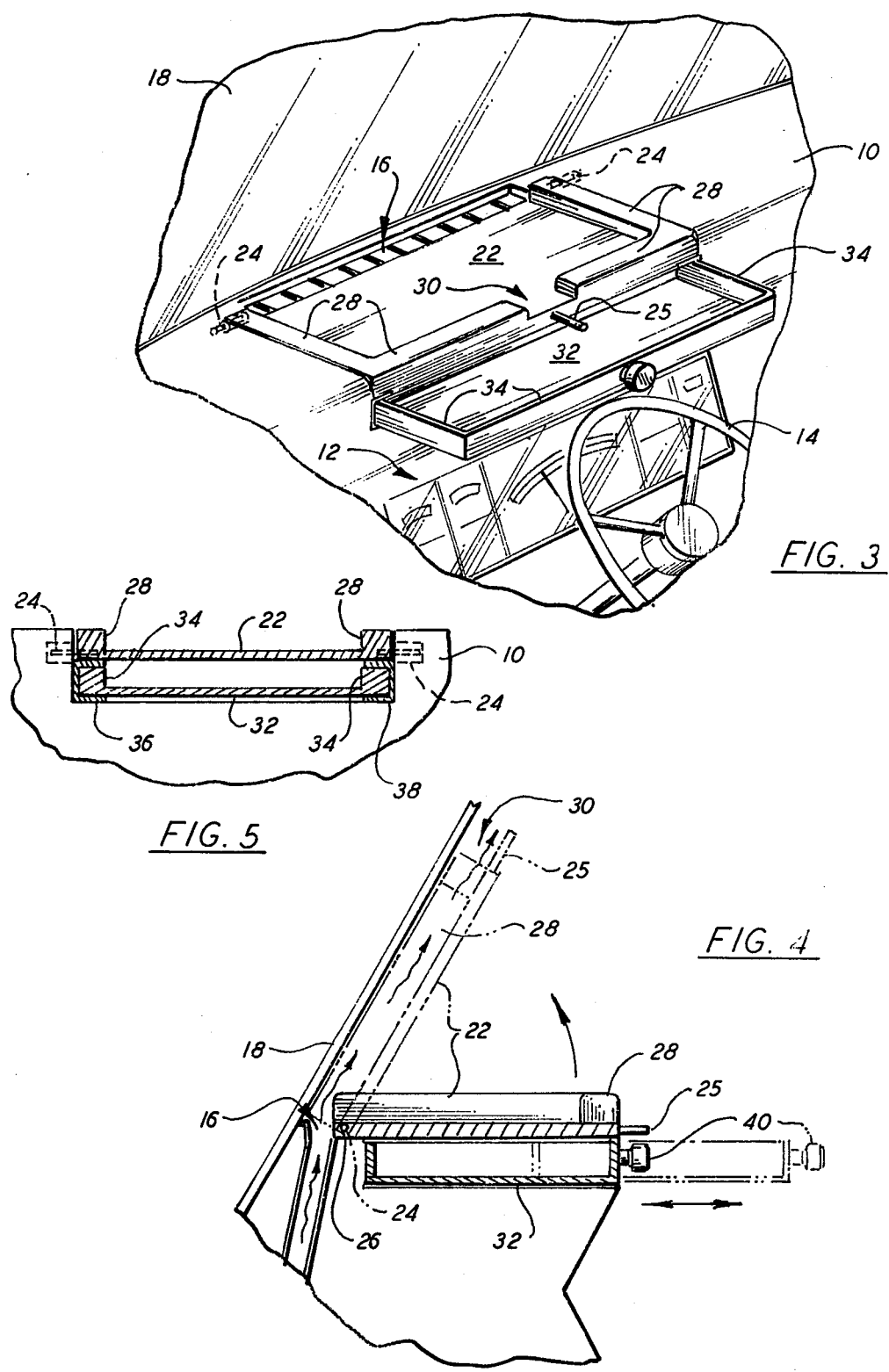

MULTI-PURPOSE DASHBOARD ATTACHMENT

BACKGROUND OF THE INVENTION

The present invention relates to automobile dashboard attachments and, more specifically, to movable panels for aiding the action of the windshield defroster, serving as glare and heat shields, and other useful functions.

The prior art includes numerous accessories or attachments for motor vehicles to be mounted thereon forwardly of the driver for various purposes. For example, U.S. Pat. Nos. 2,779,067 and 2,659,942 relate to baffle-type means which are more or less permanently and immovably mounted by clips or suction cups in spaced relation to the windshield for concentrating air from the defroster outlet on the inside surface of the windshield. In each case, the panels forming the air-directing baffles are in the driver's field of vision through the windshield and, therefore, must be transparent. However, dust, moisture, etc., may collect on the opposing surfaces of the transparent panel and windshield and is difficult to remove due to the aforementioned mounting menas. Also, being transparent, the panels do not make effective heat or glare shields.

U.S. Pat. Nos. 2,651,543 and 3,042,445 disclose inside glare shades or sun shields in the form of panels which extend completely across the lower portion of the windshield. These panels are also mounted in a semi-permanent, non-adjusting manner. U.S. Pat. Nos. 2,711,923, 2,813,749 and 3,804,456 all disclose panels arranged between the driver and windshield for pivotal movement between horizontal and vertical positions to act as glare shields when in the vertical position.

It is a principal object of the present invention to provide an automovile dashboard attachment including a movable panel which is extremely effective in concentrating defroster air on the windshield and also serves as an adjustable glare and heat shield.

A further object is to provide a multi-purpose unit for mounting in a recess in the top of an automobile dashboard which serves as an adjustable glare shield, a heat shield, a defroster aid, a drawer and an extensible shelf or tray.

Other objects will in part be obvious and will in part appear hereinafter.

SUMMARY OF THE INVENTION

In accordance with the foregoing objects, the invention contemplates a unitary structure which is installed in a recess provided for such purpose in the upper surface of a motor vehicle dashboard. The unit is installed directly forward of the driver's seat, between the steering wheel and windshield, and a second unit may also be provided forwardly of the front passenger seat.

The unit includes an opaque, rectangular panel having a raised lip bordering three edges on one side thereof. The panel is mounted for pivotal movement about an axis substantially through the fourth edge, between a lowered position, approximately horizontal and flush with the top of the dashboard, and a raised position, wherein the raised lip contacts the inside of the windshield. The panel is so arranged that air from the defroster outlet is discharged into the space between the panel and windshield, being confined by the raised lip to create an oven effect. An air outlet from this space is provided by a discontinuity in the lip along one or more sides.

Besides acting as a means for concentrating defroster heat in a confined area, resulting in much faster melting of ice, snow or frost and dissipation of moisture, the panel serves to shield glare from the hood or other parts of the auto when in the upright position. Furthermore, by providing the upper surface of the panel with a non-reflecting black surface, the panel eliminates reflections on the inside surface of the windshield when in the lowered position.

A pair of channel members are mounted in the dashboard recess along each lateral side. A second panel, also having a reaised lip along three or four sides, is slidably mounted in the channels. The pivotally mounted panel in its lowered position rests upon the channel members and covers the second mentioned panel which thus forms a shallow, concealed drawer in the dashboard for storage of small or flat objects, such as maps, coins, letters, and the like. When the drawer is pulled out, it forms a convenient tray in front of the driver or front seat passenger. Also, in certain orientations of the automobile with respect to the sun, the drawer-tray in its extended position may serve as a heat shield for the driver or passenger, or for the seat when the car is parked.

BRIEF DESCRIPTION OF THE DRAWINGS

FIG. 3 is again the same view, showing the top panel lowered and the drawer extended;

FIG. 4 is an elevational view in section on the line 4—4 of FIG. 1; and

FIG. 5 is an elevational view in section on the line 5—5 of FIG. 1.

DETAILED DESCRIPTION

Figure 1:
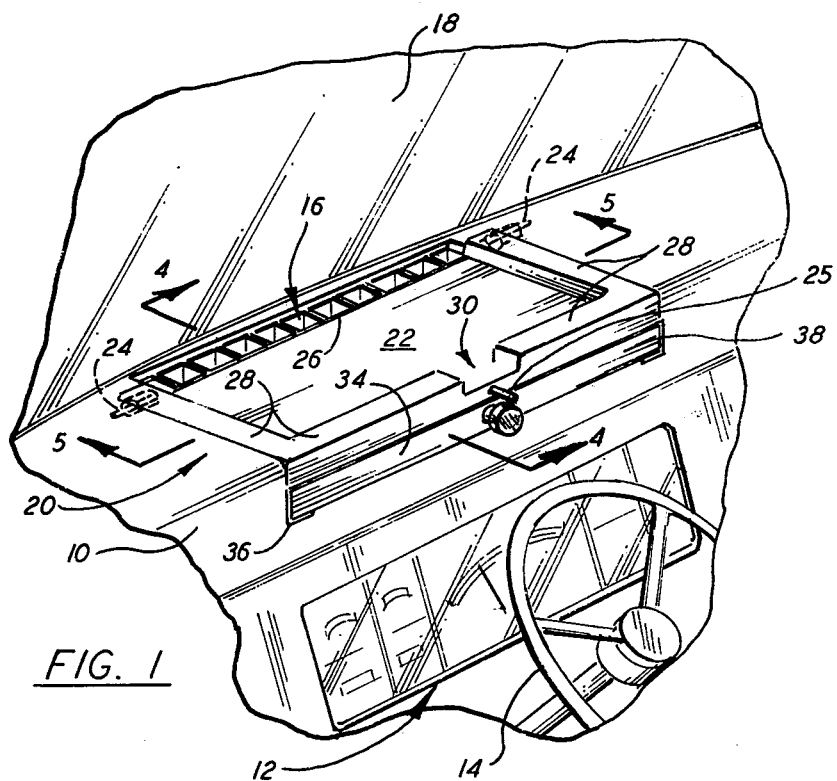
FIG. 1 is a fragmentary, perspective view showing the unit of the present invention mounted in a vehicle dashboard with the top panel lowered and the drawer inserted.
Figure 2:
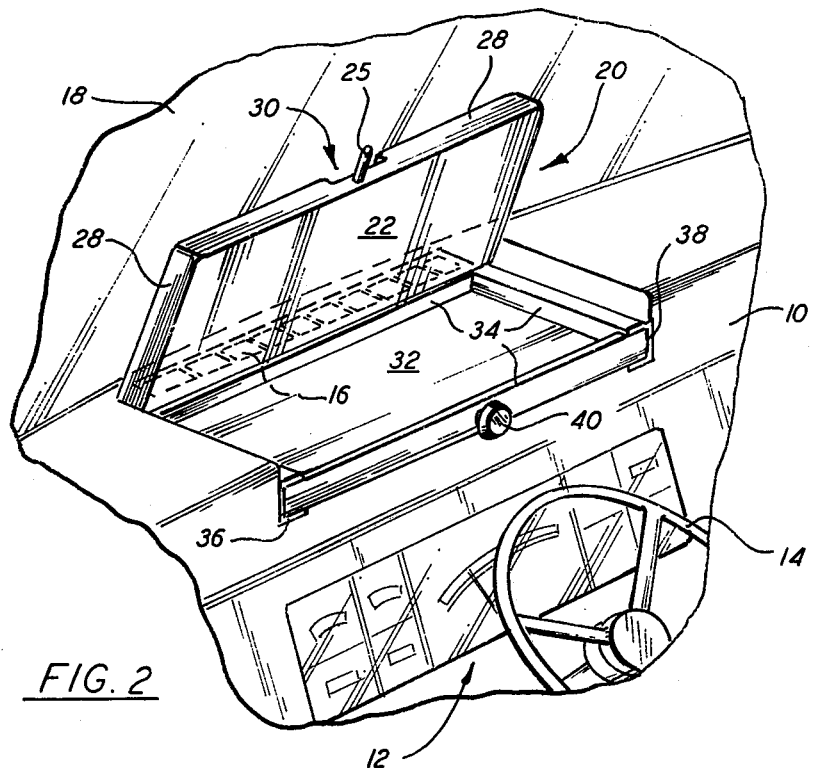
FIG. 2 is a similar view showing the top panel in the raised position and the drawer inserted.

Referring now to the drawings, in FIGS. 1-3 is shown a portion of the interior of a typical motor vehicle, such as an automobile or truck, having the usual dashboard 10 with instrument panel 12 in the front surface thereof, facing a driver seated behind steering wheel 14. Defroster air outlet 16 is conveniently positioned closely adjacent a portion of the lower edge of windshield 18. The multi-purpose unit of the present invention, generally denoted by reference numeral 20, is shown in FIG. 1 positioned entirely within a recess formed in the upper surface, and extending through the front surface, of dashboard 10.

Unit 20 includes a first rectangular panel 22, of slightly smaller dimensions than the dashboard recess, mounted for pivotal movement upon a pair of hinge pins 24 which extend from panel 22 into appropriate supports in dashboard 10. Preferably, the hinge means supporting panel 22 are of the frictionally engaged type, such as commonly used on automobile sunvisors. Thus, panel 22 may be moved to any desired position between the fully lowered and raised positions illustrated in FIGS. 1 and 2, respectively, and retained therein by the frictional fit of the hinge means. Handle 25 extends from the front edge of panel 22 for manual movement thereof.

The axis about which panel 22 is moved runs substantially through edge 26 thereof, which is closely adjacent to defroster outlet 16. Raised lip 28 borders the two side edges and the edge parallel to edge 26 of panel 22. When panel 22 is moved to its raised position, shown in FIG. 2 and in dot-dash lines in FIG. 4, a substantial portion of lip 28 contacts or is in close proximity to the inside surface of windshield 18. Defroster outlet 16 thus discharges into the confined space between panel 22 and windshield 18.

A discontinuity, indicated by reference numeral 30, in the portion of lip 28 bordering the edge of panel 22 parallel to edge 26 provides an outlet for the air in a concentrated area in the portion of the windshield directly in front of the driver. Thus, when it is necessary to melt snow or ice from the outside surface of windshield 18, or remove frost or moisture from the inside surface, panel 22 may be placed in its raised position and the oven-like effect of confining the air from the defroster will result in much faster action. When sufficient visibility through the portion of the windshield directly in front of the driver has been established, panel 22 may again be moved to its lowered position and the normal action of the defroster will be sufficient to maintain visibility. If desired, of course, panel 22 may be left in its raised position to act as a glare shield, with the air exiting from the confined space through the outlet formed by discontinuity 30 in lip 28 providing rapid and concentrated defrosting action in the area of the windshield just above the panel 22 required for at least minimal driving visibility. Providing the surface of panel 22 bounded by lip 28 with a non-reflective, black coating will effectively eliminate reflections on the inside surface of windshield 18 when panel 22 is in the lowered position of FIG. 1.

A shallow drawer is formed by rectangular panel 32, of substantially the same dimensions as panel 22, bounded on all four sides by raised lip 34. The drawer is mounted for sliding movement into and out of the recess in dashboard 10 upon channel members 36 and 38, affixed to the sides of the dashboard recess. Side portions of the lower surface of panel 22 rest upon channel members 36 and 38 when panel 22 is lowered, as shown in FIG. 1, wherein panel 22 also forms a top closure for the drawer. Handle 40 is provided for sliding movement of the drawer which, as previously mentioned, provides a convenient shelf or tray in front of the driver when extended to the position shown in FIG. 3 and in dot-dash lines in FIG. 4. The extended tray may be used to hold cups, food, etc., and also serves as an effective heat shield, preventing the sun from striking the driver's legs or body while driving, or the steering wheel or seat while parked, when the car is so oriented with respect to the sun.

From the foregoing, it is apparent that the invention provides a unitary structure which performs many useful purposes in association with the motor vehicle in which it is mounted. The unit does not detract from the appearance of the driving compartment, as do many accessories having support means, hinges, and the like, exposed on the exterior of the dashboard or in other locations. The movable portions of the unit may be easily manipulated while driving, if necessary. Although only a single unit has been illustrated and described, positioned directly forward of the driver's seat, it is apparent that a second such unit could be provided, if desired, forwardly of the front passenger seat, for the same purposes.

What is claimed is:

1. A multi-purpose unit for mounting upon the top of an automobile dashboard having an elongated defroster outlet adjacent the lower edge of the windshield forwardly of the steering wheel, said unit comprising, in combination:

(a) an essentially rectangular, planar panel member;
    (b) hinge means mounting said panel for movement between first and second positions relative to the dashboard and windshield about an axis through one edge of said panel substantially parallel and closely adjacent to the defroster outlet;
    (c) a raised lip bordering said panel on one side along the three edges thereof other than said one edge;
    (d) said one edge being so arranged with respect to the dashboard and windshield that said panel lies approximately parallel to the top surface of the dashboard when in said first position and at least a major portion of said lip is in contact with the inside of the windshield when in said second position; and
    (e) means defining at least one air outlet passage in said lip, whereby air from the defroster outlet is discharged into the space between the windshield and said panel when the latter is in said second position and exits from said space through said air outlet passage.

2. The invention according to claim 1 wherein said hinge means provide frictional engagement between said panel and the dashboard, said panel being retained in either of said first and second positions by said frictional engagement.

3. The invention according to claim 1 wherein said panel is disposed in a rectangular recess in the top of the dashboard when in said first position, said lip being substantially flush with the top surface of the dashboard.

4. The invention according to claim 1 wherein said air passage is in the portion of said lip bordering the edge of said panel parallel to said one edge.

5. The invention according to claim 1 and further including a tray horizontally disposed in a recess in the dashboard, said tray being of substantially the same rectangular dimensions as said panel, the latter being arranged in covering and uncovering positions with respect to said tray in said first and second positions, respectively, of said panel.

6. The invention according to claim 5 and further including slidable mounting means for said tray for movement thereof toward and away from the steering wheel.

7. The invention according to claim 6 and further including a raised lip bordering at least three edges of the upper side of said tray, thereby forming a shallow drawer.

8. The invention according to claim 1 wherein said panel is opaque.

9. The invention according to claim 8 wherein at least the surface of said panel bounded by said raised lip includes a non-reflective, black coating.

* * * * *